US 9,085,291 B2

(12) United States Patent
Fushiki

(10) Patent No.: US 9,085,291 B2
(45) Date of Patent: Jul. 21, 2015

(54) CONTROL SYSTEM FOR VEHICLE

(71) Applicant: Shunsuke Fushiki, Susono (JP)

(72) Inventor: Shunsuke Fushiki, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/220,613

(22) Filed: Mar. 20, 2014

(65) Prior Publication Data

US 2014/0296025 A1     Oct. 2, 2014

(30) Foreign Application Priority Data

Mar. 26, 2013   (JP) ................................. 2013-063396

(51) Int. Cl.
*B60W 20/00*   (2006.01)
*B60W 10/02*   (2006.01)
*B60W 10/06*   (2006.01)
*B60W 10/08*   (2006.01)
*F02N 11/00*   (2006.01)

(52) U.S. Cl.
CPC ............... *B60W 10/02* (2013.01); *B60W 10/06* (2013.01); *B60W 10/08* (2013.01); *B60W 20/40* (2013.01); *B60K 41/02* (2013.01); *B60W 20/10* (2013.01); *B60W 2510/244* (2013.01); *B60W 2710/025* (2013.01); *F02N 11/006* (2013.01); *Y02T 10/6221* (2013.01); *Y10S 903/93* (2013.01); *Y10T 477/23* (2015.01); *Y10T 477/26* (2015.01)

(58) Field of Classification Search
CPC ..... B60W 20/00; B60W 10/02; B60W 10/06; B60W 10/08; B60W 20/10; Y10T 477/26; F02N 11/006; B60K 41/02

USPC ............................... 477/5; 180/65.28, 65.285
See application file for complete search history.

(56) References Cited

U.S. PATENT DOCUMENTS

| 4,335,429 A * | 6/1982 | Kawakatsu ................ 701/102 |
| 6,018,198 A * | 1/2000 | Tsuzuki et al. ............... 290/17 |
| 6,083,139 A * | 7/2000 | Deguchi et al. ................ 477/5 |
| 2012/0316715 A1 | 12/2012 | Suzuki |
| 2014/0195089 A1 | 7/2014 | Kobayashi et al. |
| 2014/0371961 A1* | 12/2014 | Kim et al. ..................... 701/22 |
| 2014/0379184 A1* | 12/2014 | Kim ............................... 701/22 |

FOREIGN PATENT DOCUMENTS

| JP | 2000-145496 A | 5/2000 |
| JP | 2000-154741 A | 6/2000 |
| JP | 2004-339943 A | 12/2004 |
| JP | 2006-183547 A | 7/2006 |
| JP | 2007-076646 A | 3/2007 |

(Continued)

*Primary Examiner* — Roger Pang
(74) *Attorney, Agent, or Firm* — Kenyon & Kenyon LLP

(57) ABSTRACT

A control system for a vehicle includes: an engine; a first electric motor configured to output a starting torque for starting the engine; a second electric motor configured to output a starting torque for starting the engine and a running torque; an electrical storage device configured to supply electric power to the first electric motor and the second electric motor; and a controller configured to start the engine with the use of both the first electric motor and the second electric motor at the time of starting the engine when the sum of a required driving torque that is required for the vehicle and a required starting torque that is required to start the engine is larger than a maximum output torque of the second electric motor, which is outputtable at the electric power from the electrical storage device.

6 Claims, 6 Drawing Sheets

(56) References Cited

FOREIGN PATENT DOCUMENTS

| | | |
|---|---|---|
| JP | 2008-105494 A | 5/2008 |
| JP | 2012-111267 A | 6/2012 |
| JP | 2012-250676 A | 12/2012 |
| WO | 2013/021471 A1 | 2/2013 |

* cited by examiner

CONTROL SYSTEM FOR VEHICLE

INCORPORATION BY REFERENCE

The disclosure of Japanese Patent Application No. 2013-063396 filed on Mar. 26, 2013 including the specification, drawings and abstract is incorporated herein by reference in its entirety.

BACKGROUND OF THE INVENTION

1. Field of the Invention

The invention relates to a control system for a vehicle, which includes two electric motors that are able to output starting torque for starting an engine and, more particularly, to a technique at the time of starting the engine.

2. Description of Related Art

There is known a vehicle that includes a first electric motor (for example, a starter) that is able to output starting torque for starting an engine and a second electric motor (for example, drive motor) that is able to output the starting torque and running torque. This is, for example, a vehicle described in Japanese Patent Application Publication No. 2012-111267 (JP 2012-111267 A) or a vehicle described in Japanese Patent Application Publication No. 2000-154741 (JP 2000-154741 A). JP 2012-111267 A describes that, in a hybrid vehicle that includes a starter for starting an engine and a generator motor having the function of starting the engine and the function of propelling the vehicle by transmitting power to wheels, the reliability of engine starting at a low temperature is improved (that is, the startability of the engine is ensured) by cranking the engine with both the torques with the use of both the starter and the generator motor at the time of starting the engine in a cold state.

Incidentally, in the above-described vehicle, when the engine is started with the use of the drive motor during motor running in which the vehicle travels with the use of only the drive motor, the drive motor needs to output the sum of "running torque+starting torque". As a result, during motor running, in order to ensure engine starting with the use of the drive motor (in other words, in order to reserve charged electric power of a battery that supplies electric power to the drive motor for engine starting), the amount of running torque is limited (that is, a motor running region is limited; in other words, the electric power of the battery, which is allowed to be used in motor running, is limited). Against such an inconvenience, the vehicle that includes the starter and the drive motor is able to use both in engine starting, so not only the two electric motors are simply used in an engine cold state but also there is still room for improvement in engine starting. The above-described challenge is not publicly known.

SUMMARY OF THE INVENTION (US)

The invention provides a control system for a vehicle, which is able to expand the range of a required driving torque that can be provided by a second electric motor.

An aspect of the invention provides a control system for a vehicle. The control system includes an engine, a first electric motor, a second electric motor, an electrical storage device and a controller. The first electric motor is configured to output a starting torque for starting the engine. The second electric motor is configured to output a starting torque for starting the engine and a running torque. The electrical storage device is configured to supply electric power to the first electric motor and the second electric motor. The controller is configured to start the engine with the use of both the first electric motor and the second electric motor at the time of starting the engine when the sum of a required driving torque that is required for the vehicle and a required starting torque that is required to start the engine is larger than a maximum output torque of the second electric motor, which is outputtable at the electric power from the electrical storage device.

With this configuration, the engine is started with the use of both the first electric motor and the second electric motor, so, in comparison with the case where the engine is started with the use of only the second electric motor, the amount of electric power that is allowed to be used to output the running torque from the second electric motor is increased within the electric power from the electrical storage device. Thus, it is possible to expand the range of the required driving torque that can be provided by the second electric motor.

In the control system, the controller may be configured to start the engine with the use of both the first electric motor and the second electric motor when the sum of the required driving torque and the required starting torque is smaller than or equal to the sum of a maximum output torque of the first electric motor, which is outputtable at the electric power from the electrical storage device, and the maximum output torque of the second electric motor, which is outputtable at the electric power from the electrical storage device. With this configuration, in comparison with the case where the engine is started with the use of only the second electric motor, the amount of electric power that is allowed to be used to output the running torque from the second electric motor is increased within the electric power from the electrical storage device. In addition, the starting performance of the engine is ensured.

In the control system, the controller may be configured to start the engine with the use of both the first electric motor and the second electric motor when the required starting torque is smaller than or equal to the sum of a maximum output torque of the first electric motor, which is outputtable at the electric power from the electrical storage device, and the maximum output torque of the second electric motor, which is outputtable at the electric power from the electrical storage device, in a case where the required starting torque is larger than the maximum output torque of the second electric motor, which is outputtable at the electric power from the electrical storage device, in preference to a case where the sum of the required driving torque and the required starting torque is larger than the maximum output torque of the second electric motor. With this configuration, even when the required starting torque is relatively large, it is possible to expand an engine startable region. That is, it is possible to increase the opportunity for starting the engine.

In the control system, the first electric motor may be configured to output the maximum output torque of the first electric motor, which is outputtable at the electric power from the electrical storage device, at the time of starting the engine with the use of the first electric motor. With this configuration, the amount of electric power that is allowed to be used to output the running torque from the second electric motor is further increased within the electric power from the electrical storage device. Thus, it is possible to further expand the range of the required driving torque that can be provided by the second electric motor.

In the control system, the first electric motor may be a starter, and the electrical storage device may include a first electrical storage device configured to supply electric power to the first electric motor and a second electrical storage device configured to supply electric power to the second electric motor. With this configuration, in comparison with the case where the engine is started with the use of only the second electric motor, the amount of electric power that is allowed to be used to output the running torque from the second electric motor is increased within the electric power from the electrical storage device.

In the control system, the second electric motor may be provided in a power transmission path between the engine and a drive wheel, and the second electric motor may be coupled to the engine via a clutch, the controller may be configured to be able to carry out motor running in which the running torque is transmitted to the drive wheel with the use of only the second electric motor in a state where the clutch is released, and the controller may be configured to transmit the starting torque from the second electric motor to the engine by setting the clutch in one of a slipped state and an engaged state at the time of starting the engine with the use of the second electric motor. With this configuration, in comparison with the case where the engine is started with the use of only the second electric motor, the amount of electric power that is allowed to be used to output the running torque from the second electric motor is increased within the electric power from the electrical storage device. Thus, it is possible to expand a motor running region in which the second electric motor is used.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is an example of a graph that shows an MG torque, a starter assist torque, a required starting torque, and the like, in association with an EV traveling region, and the like;

DETAILED DESCRIPTION OF EMBODIMENTS

In the invention, the vehicle includes a transmission in a power transmission path between the engine (or the electric motor) and the drive wheel. The transmission is a manual transmission, such as a known synchromesh parallel-two-shaft transmission including a plurality of pairs of constant-mesh transmission gears between the two shafts, various automatic transmissions (a planetary gear automatic transmission, a synchromesh parallel-two-shaft automatic transmission, a DCT, a CVT, and the like), or the like. Each of the automatic transmissions is formed of an automatic transmission alone, an automatic transmission including a fluid transmission device, an automatic transmission including an auxiliary transmission, or the like.

The engine is, for example, an internal combustion engine, such as a gasoline engine and a diesel engine, that generates power through combustion of fuel. The clutch provided in a power transmission path between the engine and the electric motor is a wet-type or dry-type engagement device.

Hereinafter, an embodiment of the invention will be described in detail with reference to the accompanying drawings.

Figure 1:
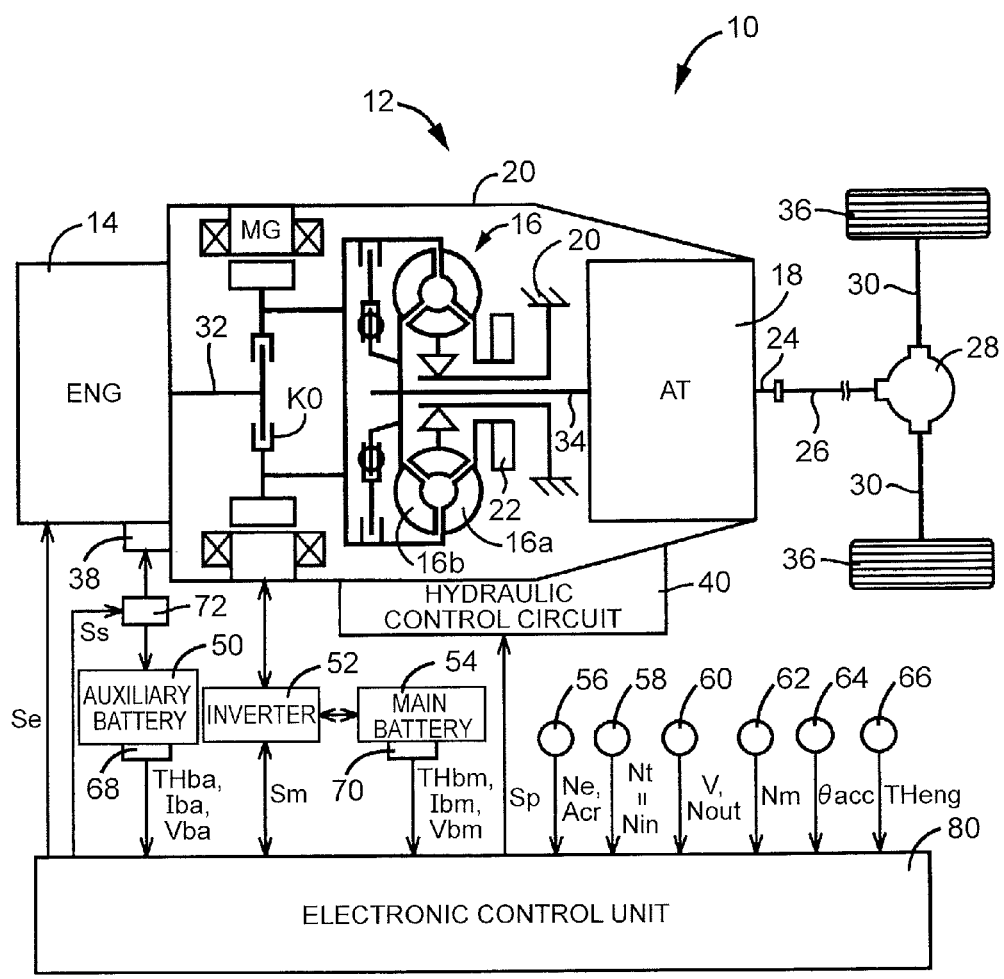
FIG. 1 is a view that illustrates the schematic configuration of a drive line provided in a vehicle to which the invention is applied and is a view that illustrates a relevant portion of a control system in the vehicle.

FIG. 1 is a view that illustrates the schematic configuration of a drive line 12 provided in a vehicle 10 to which the invention is applied and is a view that illustrates a relevant portion of a control system for various controls in the vehicle 10. In FIG. 1, the vehicle 10 is a hybrid vehicle that includes an engine 14 and an electric motor MG as driving force sources. The drive line 12 includes an engine separating clutch K0 (hereinafter, referred to as separating clutch K0), a torque converter 16, an automatic transmission 18, and the like, in order from the engine 14 side inside a transmission case 20. The torque converter 16 serves as a fluid transmission device. The transmission case 20 serves as a non-rotating member. The drive line 12 includes a propeller shaft 26, a differential gear 28, a pair of axles 30, and the like. The propeller shaft 26 is coupled to a transmission output shaft 24 that is an output rotating member of the automatic transmission 18. The differential gear 28 is coupled to the propeller shaft 26. The pair of axles 30 are coupled to the differential gear 28. A pump impeller 16a of the torque converter 16 is coupled to an engine coupling shaft 32 via the separating clutch K0, and is directly coupled to the electric motor MG. A turbine impeller 16b of the torque converter 16 is directly coupled to a transmission input shaft 34 that is an input rotating member of the automatic transmission 18. A mechanical oil pump 22 is coupled to the pump impeller 16a. The mechanical oil pump 22 generates operating hydraulic pressure for carrying out shift control over the automatic transmission 18, engagement/release control over the separating clutch K0, and the like, by being rotationally driven by the engine 14 (and/or the electric motor MG). The thus configured drive line 12 is, for example, used in the FR vehicle 10. In the drive line 12, the power (which is synonymous with torque and force unless otherwise specifically distinguished from each other) of the engine 14 is transmitted from the engine coupling shaft 32 to a pair of drive wheels 36 sequentially via the separating clutch K0, the torque converter 16, the automatic transmission 18, the propeller shaft 26, the differential gear 28, the pair of axles 30, and the like, when the separating clutch K0 is engaged. The engine coupling shaft 32 couples the engine 14 to the separating clutch K0. In this way, the drive line 12 constitutes a power transmission path from the engine 14 to the drive wheels 36. The vehicle 10 further includes a starter 38 that is a direct-current motor. The starter 38 is able to crank the engine 14 by being operated upon reception of electric power supplied from an auxiliary battery 50.

The automatic transmission 18 is a transmission that constitutes part of the power transmission path between both the engine 14 and the electric motor MG and the drive wheels 36 and that transmits power from the driving force sources (the engine 14 and the electric motor MG) to the drive wheels 36 side. The automatic transmission 18 is, for example, a known planetary gear-type multi-speed transmission in which a plurality of speed positions having different speed ratios (gear ratios) γ (=Transmission input rotation speed Nin/Transmission output rotation speed Nout) are selectively established, a known continuously variable transmission in which the gear ratio γ is continuously variable in a stepless manner, or the like. In the automatic transmission 18, for example, a predetermined gear position is established on the basis of driver's accelerator operation, a vehicle speed V, and the like, by controlling a hydraulic actuator with the use of a hydraulic control circuit 40.

The electric motor MG is a so-called motor generator having the function of a motor that generates mechanical power from electric energy and the function of a generator that generates electric energy from mechanical energy. The electric motor MG functions as the driving force source that generates running power instead of the engine 14 that is a power source or in addition to the engine 14. The electric motor MG is provided in the power transmission path between the engine 14 and the drive wheels 36, and carries out the following operations. That is, the electric motor MG, for example, generates electric energy through regeneration from power generated by the engine 14 or driven force that is input from the drive wheels 36 side, and stores the electric energy in a main battery 54 via an inverter 52. The electric motor MG is coupled to the power transmission path between the separating clutch K0 and the torque converter 16. Power is transmitted to each other between the electric motor MG and the pump impeller 16a. Thus, the electric motor MG is coupled to the engine 14 via the separating clutch K0, and is coupled to the transmission input shaft 34 of the automatic transmission 18 such that power is transmittable without passing through the separating clutch K0. The electric motor MG is able to crank the engine 14 by being operated upon reception of electric power supplied from the main battery 54 in a slipped state or engaged state of the separating clutch K0.

The separating clutch K0 is, for example, a wet-type multi-disc friction engagement device in which a plurality of mutually stacked friction plates are pressed by the hydraulic actuator. The separating clutch K0 undergoes engagement/release control from the hydraulic control circuit 40 by using hydraulic pressure that is generated by the oil pump 22 as a source pressure. In the engagement/release control, a torque capacity (hereinafter, referred to as K0 torque) of the separating clutch K0 is changed by regulating a linear solenoid valve, or the like, in the hydraulic control circuit 40. In the engaged state of the separating clutch K0, the pump impeller 16a and the engine 14 are integrally rotated via the engine coupling shaft 32. On the other hand, in a released state of the separating clutch K0, transmission of power between the engine 14 and the pump impeller 16a is interrupted. That is, the engine 14 and the drive wheels 36 are disconnected from each other by releasing the separating clutch K0. Because the electric motor MG is coupled to the pump impeller 16a, the separating clutch K0 also functions as a clutch that is provided in the power transmission path between the engine 14 and the electric motor MG and that connects or interrupts the power transmission path.

The starter 38 functions as a first electric motor that is able to output starting torque used to start the engine 14. The electric motor MG functions as a second electric motor that is able to output the starting torque and running force (for example, running torque). In this way, the vehicle 10 includes the two electric motors that are able to output the starting torque used to start the engine 14. On the other hand, the auxiliary battery 50 functions as a first electrical storage device that supplies electric power to the starter 38. The main battery 54 function as a second electrical storage device that supplies electric power to the electric motor MG In this way, the vehicle 10 includes the auxiliary battery 50 and the main battery 54 as the electrical storage devices that supply electric power to the starter 38 and the electric motor MG The auxiliary battery 50 may be, for example, charged with electric power generated by a generator (alternator) that generates electric power by being rotationally driven by the engine 14 or may be charged with electric power by stepping down the voltage of the main battery 54 connected via a DC/DC converter, or the like. As described above, the main battery 54 is charged with electric power regenerated (electric power generated) by the electric motor MG; instead, the main battery 54 may be charged (plug-in charged) with electric power from a commercial power supply, or the like, outside the vehicle, such as a charging station and a domestic power supply.

The vehicle 10, for example, includes an electronic control unit 80 that is included in a control system for the vehicle 10, which is associated with starting control over the engine 14, or the like. The electronic control unit 80 is, for example, configured to include a so-called microcomputer including a CPU, a RAM, a ROM, an input/output interface, and the like. The CPU executes various controls over the vehicle 10 by carrying out signal processing in accordance with a program prestored in the ROM while utilizing the temporary storage function of the RAM. For example, the electronic control unit 80 is configured to execute output control over the engine 14, drive control over the electric motor MG, including regenerative control over the electric motor MG, shift control over the automatic transmission 18, torque capacity control over the separating clutch K0, and the like. The electronic control unit 80 is formed separately in a unit for engine control, a unit for electric motor control, a unit for hydraulic pressure control, and the like, as needed. Various signals based on detected values of various sensors are supplied to the electronic control unit 80. The various sensors, for example, include an engine rotation speed sensor 56, a turbine rotation speed sensor 58, an output shaft rotation speed sensor 60, an electric motor rotation speed sensor 62, an accelerator operation amount sensor 64, a coolant temperature sensor 66, an auxiliary battery sensor 68, a main battery sensor 70, and the like. The various signals, for example, include an engine rotation speed Ne that is the rotation speed of the engine 14, a crank angle Acr, a turbine rotation speed Nt, that is, a transmission input rotation speed Nin that is the rotation speed of the transmission input shaft 34, a transmission output rotation speed Nout that is the rotation speed of the transmission output shaft 24 and corresponds to a vehicle speed V, an electric motor rotation speed Nm that is the rotation speed of the electric motor MG, an accelerator operation amount θacc corresponding to a driver's drive request amount to the vehicle 10, a coolant temperature THeng that is the temperature of coolant of the engine 14 and corresponds to the temperature of the engine 14, an auxiliary battery temperature THba, auxiliary battery charging/discharging current Iba and auxiliary battery voltage Vba of the auxiliary battery 50, a main battery temperature THbm, main battery charging/discharging current Ibm, main battery voltage Vbm, and the like, of the main battery 54. For example, an engine output control command signal Se for output control over the engine 14, an electric motor control command signal Sm for controlling the operation of the electric motor MG, hydraulic pressure command signals Sp for operating electromagnetic valves (solenoid valves), and the like, included in the hydraulic control circuit 40 for controlling the hydraulic actuators of the separating clutch K0 and automatic transmission 18, a starter command signal Ss for controlling the operation of the starter 38 by turning on or off a starter relay 72 provided in a circuit between the starter 38 and the auxiliary battery 50, and the like, are respectively output from the electronic control unit 80 to an engine control device, such as a throttle actuator and a fuel injection device, the inverter 52, the hydraulic control circuit 40, the circuit including the starter relay 72, and the like. A charged amount of the auxiliary battery 50 (auxiliary battery charged amount, auxiliary battery state of charge, auxiliary battery charged level) SOCa is calculated by the electronic control unit 80 on the basis of, for example, an auxiliary battery charging/discharging current Iba, or the like, a charged amount of the main battery 54 (main battery charged amount, main battery state of charge, main battery charged level) SOCm, a main battery chargeable power Winm and a main battery dischargeable power Woutm are calculated by the electronic control unit 80 on the basis of a main battery temperature THbm, a main battery charging/discharging current Ibm and a main battery voltage Vbm, and each of those calculated values is used in various controls as one of the above-described various signals.

Figure 2:
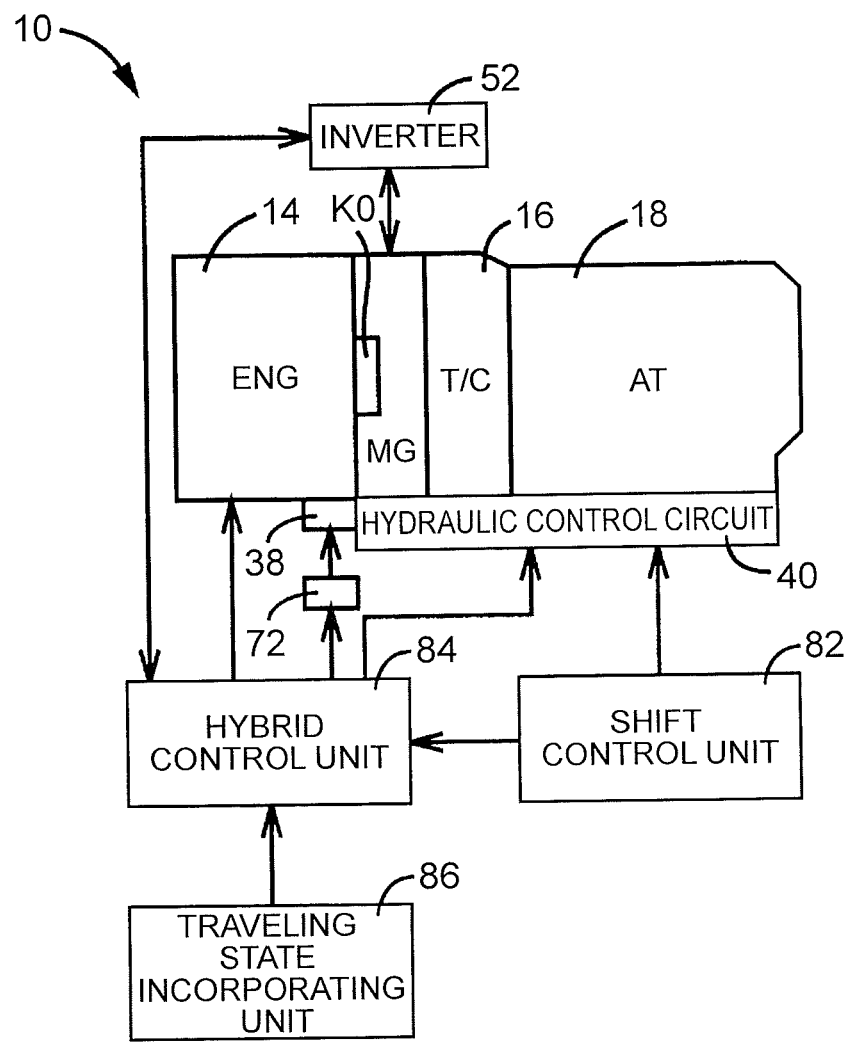
FIG. 2 is a functional block diagram that illustrates a relevant portion of control functions of an electronic control unit.

FIG. 2 is a functional block diagram that illustrates a relevant portion of control functions of the electronic control unit 80. In FIG. 2, a shift control means, that is, a shift control unit 82, determines whether to shift the automatic transmission 18 on the basis of, for example, a vehicle state (for example, an actual vehicle speed V, an actual accelerator operation amount θacc, and the like) by consulting a known correlation (shift line map, shift map (not shown)) predetermined by using a vehicle speed V and a drive request amount (for example, accelerator operation amount θacc, or the like) as variables, outputs a shift command value for obtaining the determined gear position to the hydraulic control circuit 40, and executes automatic shift control over the automatic transmission 18. The shift command value is one of the hydraulic pressure command signals Sp.

A hybrid control unit 84 has the function of an engine drive control unit that executes drive control over the engine 14 and the function of an electric motor operation control unit that controls the operation of the electric motor MG as a driving force source or a generator via the inverter 52, and executes hybrid drive control, or the like, with the use of the engine 14 and the electric motor MG through those control functions. For example, the hybrid control unit 84 calculates a required driving torque Tdtgt as the drive request amount that is required for the vehicle 10 by a driver on the basis of the accelerator operation amount θacc and the vehicle speed V. In consideration of a transmission loss, an auxiliary load, the gear ratio γ of the automatic transmission 18, the chargeable and dischargeable powers Winm, Woutm of the main battery 54, the command signals (the engine output control command signal Se and the electric motor control command signal Sm) are output for controlling the driving force sources so as to obtain the output torques of the driving force sources (the engine 14 and the electric motor MG), which achieve the required driving torque Tdtgt. Other than the required driving torque Tdtgt [Nm] of the drive wheels 36, the drive request amount may be a required driving force [N] of the drive wheels 36, a required driving power [W] of the drive wheels 36, a required transmission output torque Touttgt of the transmission output shaft 24, a required transmission input torque Tintgt of the transmission input shaft 34, or the like. The drive request amount may also be merely the accelerator operation amount θacc [%], a throttle valve opening degree [%], an intake air amount [g/sec], or the like.

For example, when the required driving torque Tdtgt falls within the range in which the required driving torque Tdtgt can be provided by only the output torque Tm of the electric motor MG, the hybrid control unit 84 sets a traveling mode to a motor running mode (hereinafter, EV mode), and carries out motor running (EV traveling) in which the vehicle travels while transmitting running torque to the drive wheels 36 with the use of only the electric motor MG in a state where the separating clutch K0 is released. On one hand, for example, when the required driving torque Tdtgt falls within the range in which the required driving torque Tdtgt cannot be provided unless at least the output torque Te of the engine 14 is used, the hybrid control unit 84 sets the traveling mode to an engine running mode, that is, a hybrid traveling mode (hereinafter, EHV mode), and carries out engine running, that is, hybrid traveling (EHV traveling) in which the vehicle travels with the use of at least the engine 14 as the driving force source in a state where the separating clutch K0 is engaged. On the other hand, for example, even when the required driving torque Tdtgt falls within the range in which the required driving torque Tdtgt can be provided by only the MG torque Tm, but when charging of the main battery 54 is required or warm-up of the engine 14 or device associated with the engine 14 is required, the hybrid control unit 84 carries out EHV traveling. In the case of EHV traveling (EHV mode) at the time of issuance of a charging request, a warm-up request, or the like, the engine torque Te is not required as the running torque, so the separating clutch K0 does not always need to be engaged.

During a stop of the engine 14, for example, when the required driving torque Tdtgt falls within the range in which the required driving torque Tdtgt cannot be provided unless at least the engine torque Te is used, when the main battery charged amount SOCm becomes lower than a predetermined amount predetermined as a lower limit value at or above which charging of the main battery 54 is not required or when the coolant temperature THeng becomes lower than a predetermined coolant temperature predetermined as a lower limit value of an engine normal temperature state at or above which warm-up of the engine 14 is not required, the hybrid control unit 84 determines that an engine starting request has been issued, changes the traveling mode from the EV mode to the EHV mode, and starts the engine 14.

In a method of starting the engine 14 by the hybrid control unit 84, for example, the engine rotation speed Ne is increased by setting the released separating clutch K0 in the slipped or engaged state (in other words, by rotationally driving the engine 14 with the use of the electric motor MG), and the engine 14 is started by starting engine ignition, fuel supply, and the like. In this starting method, a command value (K0 command pressure) of an engagement hydraulic pressure (K0 hydraulic pressure) of the separating clutch K0 is output so as to obtain K0 torque for transmitting a required starting torque Tsreq to the engine 14 side. The required starting torque Tsreq is a torque required to start the engine 14. The required starting torque Tsreq corresponds to a starting torque that is transmitted from the electric motor MG to the engine 14, that is, part of the MG torque Tm, flowing to the engine 14 side via the separating clutch K0. Therefore, during a stop of the engine 14, the required starting torque Tsreq should be ensured in preparation for engine starting. That is, the required starting torque Tsreq within the outputtable MG torque Tm is desirably not used in EV traveling, and a region in which EV traveling is allowed (EV traveling region) is limited such that the required starting torque Tsreq is ensured. Thus, the range in which the required driving torque Tdtgt can be provided by only the MG torque Tm is a torque region that excludes the required starting torque Tsreq from the maximum MG torque Tm (maximum MG torque Tmmax) that is outputtable at the main battery dischargeable power Woutm.

Here, because the vehicle 10 includes the starter 38, part of the required starting torque Tsreq can be provided from the starting torque that is outputtable by the starter 38. That is, it is possible to assist the electric motor MG in engine starting with the use of the starter 38. As a result, an EV traveling region expands by the amount of torque that is output by the starter 38. In the present embodiment, the starting torque that is output by the starter 38 at this time is referred to as starter assist torque TstA.

Figure 3:
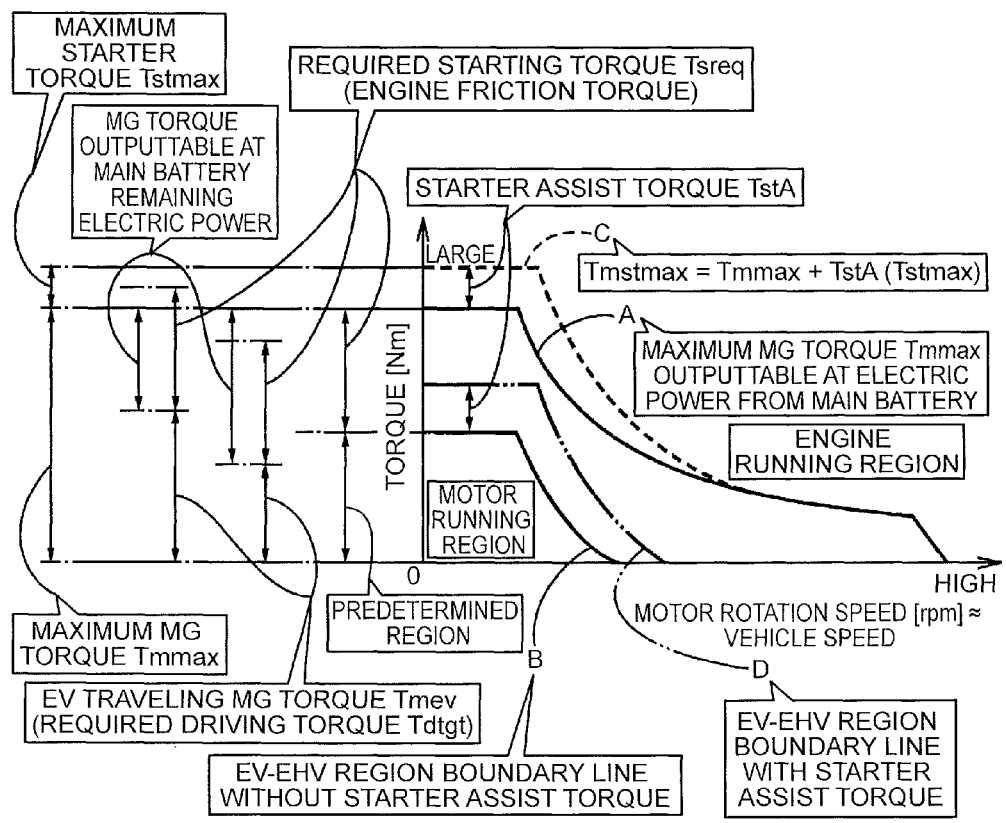

FIG. 3 is a graph that shows the MG torque Tm, the starter assist torque TstA, the required starting torque Tsreq, and the like, in association with the EV traveling region, and the like. In FIG. 3, the continuous line A indicates the maximum MG torque Tmmax at the main battery dischargeable power Woutm. The continuous line B indicates a torque obtained by subtracting the required starting torque Tsreq from the maximum MG torque Tmmax, and indicates the maximum value of the MG torque Tm that is allowed to be used in EV traveling when the starter assist torque TstA is not used. That is, the continuous line B corresponds to a boundary line (EV-EHV region boundary line) that separates the EV traveling region and the EHV traveling region from each other in the case where the starter assist torque TstA is not used. A region on a lower rotation lower torque side with respect to this line is the EV traveling region in which EV traveling is allowed. The dashed line C indicates a torque obtained by adding the starter assist torque TstA to the maximum MG torque Tmmax, and indicates the maximum value of torque (maximum torque Tmstmax) that is outputtable by the electric motor MG and the starter 38. The alternate long and two-short dashed line D indicates a torque obtained by subtracting the required starting torque Tsreq from the maximum torque Tmstmax, indicates the maximum value of the MG torque Tm that is allowed to be used in EV traveling when the starter assist torque TstA is used, and corresponds to an EV-EHV region boundary line in the case where the starter assist torque TstA is used. In this way, it is possible to expand the EV traveling region by supporting engine starting with the use of the starter 38.

As shown in FIG. 3, when the MG torque Tm (EV traveling MG torque Tmev; in other words, the required driving torque Tdtgt) during EV traveling falls within the EV traveling region that is a predetermined region in which the required starting torque Tsreq is reserved in the maximum MG torque Tmmax, the required starting torque Tsreq can be sufficiently provided by the remaining MG torque Tm in the maximum MG torque Tmmax (in other words, the MG torque Tm that is outputtable at the remaining electric power (main battery remaining electric power) after electric power is used for the EV traveling MG torque Tmev within the main battery dischargeable power Woutm). On the other hand, when the EV traveling MG torque Tmev does not fall within the EV traveling region, the required starting torque Tsreq cannot be provided by the MG torque Tm that is outputtable at the main battery remaining electric power. Therefore, at the time of starting the engine 14, the hybrid control unit 84 starts the engine 14 with the use of only the electric motor MG when the sum of the required driving torque Tdtgt and the required starting torque Tsreq is smaller than or equal to the maximum MG torque Tmmax that is outputtable at the main battery dischargeable power Woutm; whereas the hybrid control unit 84 starts the engine 14 with the use of both the electric motor MG and the starter 38 when the sum of the required driving torque Tdtgt and the required starting torque Tsreq is larger than the maximum MG torque Tmmax. At the time of starting the engine 14 with the use of the starter 38, the hybrid control unit 84 causes the starter 38 to output the maximum torque of a capacity that can be ensured by the starter 38 at that time (for example the maximum starter assist torque TstA (maximum starter torque Tstmax) that is outputtable at the electric power from the auxiliary battery 50) in order to further expand the EV traveling region.

If engine starting is predicated on starting during EV traveling, the hybrid control unit 84 starts the engine 14 with the use of both the electric motor MG and the starter 38 when the sum of the required driving torque Tdtgt and the required starting torque Tsreq is smaller than or equal to the sum of the maximum MG torque Tmmax that is outputtable at the main battery dischargeable power Woutm and the maximum starter torque Tstmax that is outputtable at the electric power from the auxiliary battery 50. In other words, the hybrid control unit 84 completes engine starting with the use of both the electric motor MG and the starter 38 before the required starting torque Tsreq exceeds the sum of the MG torque Tm that is outputtable at the main battery remaining electric power and the maximum starter torque Tstmax.

During a stop of the vehicle or at the time of issuance of an engine starting request in a state where the EV traveling MG torque Tmev is significantly low (at the time of issuance of a charging request, a warm-up request, or the like), it is presumable that whether to also use the starter 38 in combination should be determined on the basis of whether the required starting torque Tsreq can be provided by the maximum MG torque Tmmax that is outputtable at the main battery dischargeable power Woutm. Therefore, the hybrid control unit 84 starts the engine 14 with the use of both the electric motor MG and the starter 38 when the required starting torque Tsreq is smaller than or equal to the sum of the maximum MG torque Tmmax and the maximum starter torque Tstmax in the case where the required starting torque Tsreq is larger than the maximum MG torque Tmmax in preference to the case where the sum of the required driving torque Tdtgt and the required starting torque Tsreq is larger than the maximum MG torque Tmmax. Such a method mainly focuses on engine starting. For example, as will be described later, it is engine starting that is useful in the case where the required starting torque Tsreq is relatively large. It is the method for avoiding as much as possible a possibility that, unless a start of the engine 14 is initiated immediately when the engine starting is required, the opportunity of the engine starting disappears thereafter. That is, the hybrid control unit 84 initiates engine starting with the use of both the electric motor MG and the starter 38 before the required starting torque Tsreq becomes larger than or equal to the sum of the maximum MG torque Tmmax and the maximum starter torque Tstmax.

Figure 4:
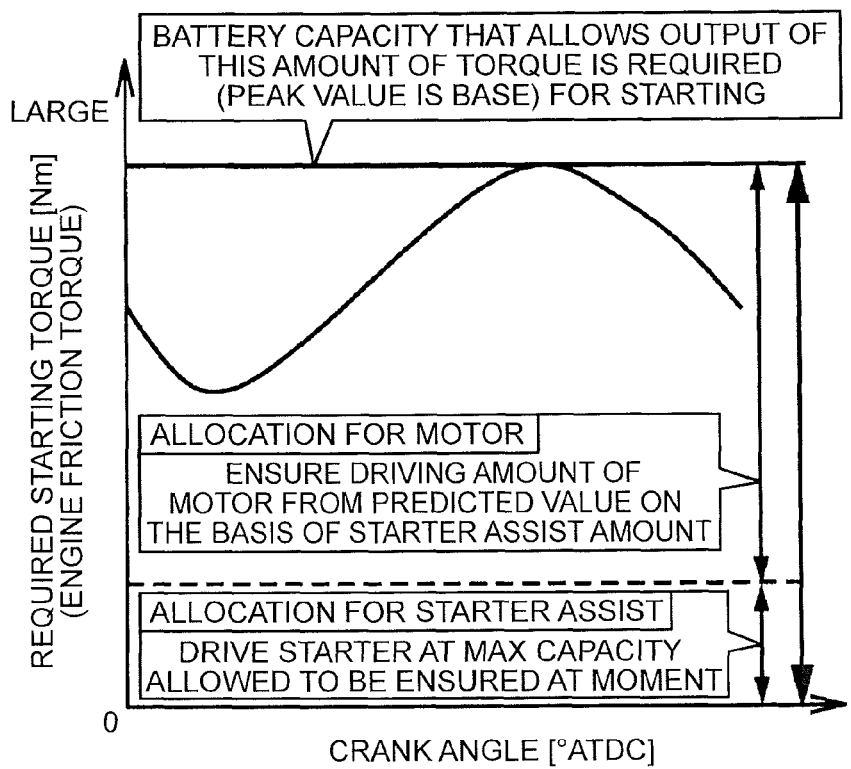
FIG. 4 is an example of a graph that illustrates a change in engine friction torque at the time of starting an engine and an operating method for an electric motor and a starter.

The required starting torque Tsreq corresponds to a friction torque of the engine 14 at the time of engine starting. The engine friction torque is the sum of a compression torque corresponding to a pumping loss of the engine and a mechanical friction torque corresponding to a sliding resistance. For example, as shown in FIG. 4, the engine friction torque varies with the crank angle Acr of the engine 14. Therefore, in the present embodiment, the required starting torque Tsreq is based on the peak value of the engine friction torque at different times. In FIG. 4, when the engine 14 is started with the use of both the electric motor MG and the starter 38, the starter 38 assists the engine 14 in starting by rotationally driving the engine 14 at the maximum starter torque Tstmax, and the electric motor MG rotationally drives the engine 14 at a torque obtained by subtracting the assist torque of the starter 38 from the required starting torque Tsreq. That is, the hybrid control unit 84 determines the MG torque Tm (Starting MG torque Tmes=Tsreq−Tstmax) required as the starting torque that is output by the electric motor MG on the basis of the required starting torque Tsreq and the maximum starter torque Tstmax. The hybrid control unit 84 outputs the starter command signal Ss for turning on the starter relay 72, and rotationally drives the engine 14 by operating the starter 38 at the maximum performance. In addition, the hybrid control unit 84 rotationally drives the engine 14 by outputting the starting MG torque Tmes from the electric motor MG. At this time, the hybrid control unit 84 operates the starter 38 first, and subsequently causes the electric motor MG to output the starting MG torque Tmes. This is because it is practically useful that the engine is started with the use of only the starter 38 in the region in which the engine friction torque is relatively high and a load on the electric motor MG is suppressed as much as possible. Thus, the hybrid control unit 84 initially rotationally drives the engine 14 with the use of the starter 38, and rotationally drives the engine 14 with the use of the electric motor MG in addition to the starter 38 after exceeding the range of the predetermined crank angle Acr, that is, a region in which the engine friction torque is relatively large. Subsequently, the hybrid control unit 84 stops rotationally driving (cranking) the engine 14 with the use of both the starter 38 and the electric motor MG when the engine rotation speed Ne becomes higher than or equal to a predetermined value. The above-described predetermined value is a cranking completion determination value predetermined as the engine rotation speed Ne at which the engine 14 is able to carry out complete explosion (autonomously rotatable) through, for example, fuel supply or ignition.

Figure 5:
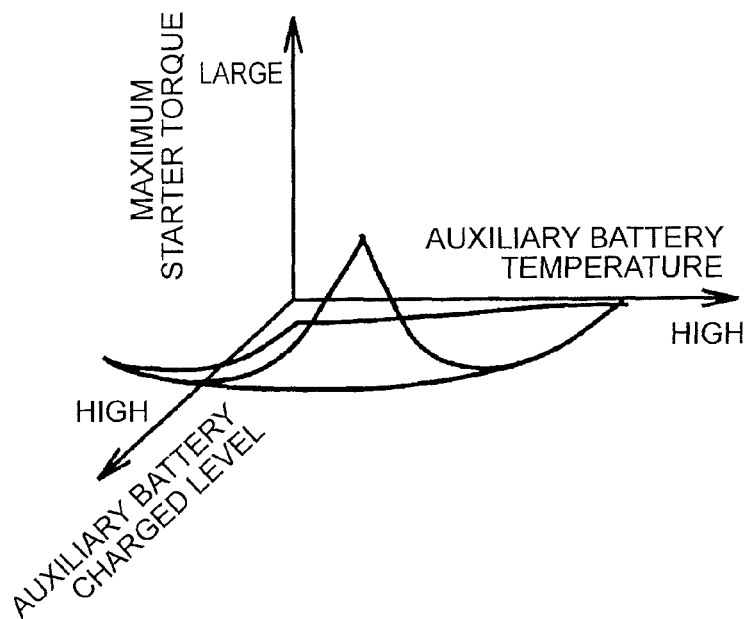
FIG. 5 is a graph that shows an example of a maximum starter torque map for estimating a maximum starter torque on the basis of an auxiliary battery charged level and an auxiliary battery temperature.

Incidentally, at the time of starting the engine 14, the output torques of the starter 38 and electric motor MG are not determined on the basis of, for example, rated values but determined on the basis of an available electric power. This is practically useful in consideration of the fact that the electric power varies on the basis of a traveling state. The main battery dischargeable power Woutm is calculated on the basis of the main battery charged level SOCm, the main battery temperature THbm, and the like, and the MG torque Tm based on the main battery dischargeable power Woutm may be regarded as the torque that has already incorporated the traveling state. On the other hand, the electric power of the auxiliary battery 50 is not calculated in the present embodiment. Therefore, a traveling state incorporating means, that is, a traveling state incorporating unit 86, estimates the maximum starter torque Tstmax that is outputtable at the electric power from the auxiliary battery 50 on the basis of the auxiliary battery charged level SOCa and the auxiliary battery temperature THba. Specifically, the traveling state incorporating unit 86, for example, calculates an estimated value of the maximum starter torque Tstmax on the basis of an actual auxiliary battery charged level SOCa and an actual auxiliary battery temperature THba by consulting a predetermined correlation (maximum starter torque map) in coordinates having the maximum starter torque Tstmax, the auxiliary battery charged level SOCa and the auxiliary battery temperature THba as variables as shown in FIG. 5. In FIG. 5, as the auxiliary battery charged level SOCa increases or as the auxiliary battery temperature THba increases, the maximum starter torque Tstmax is increased. It is also applicable that the electric power of the auxiliary battery 50 is calculated on the basis of the auxiliary battery charged level SOCa and the auxiliary battery temperature THba and then the maximum starter torque Tstmax is estimated on the basis of the calculated electric power of the auxiliary battery 50.

Figure 6:
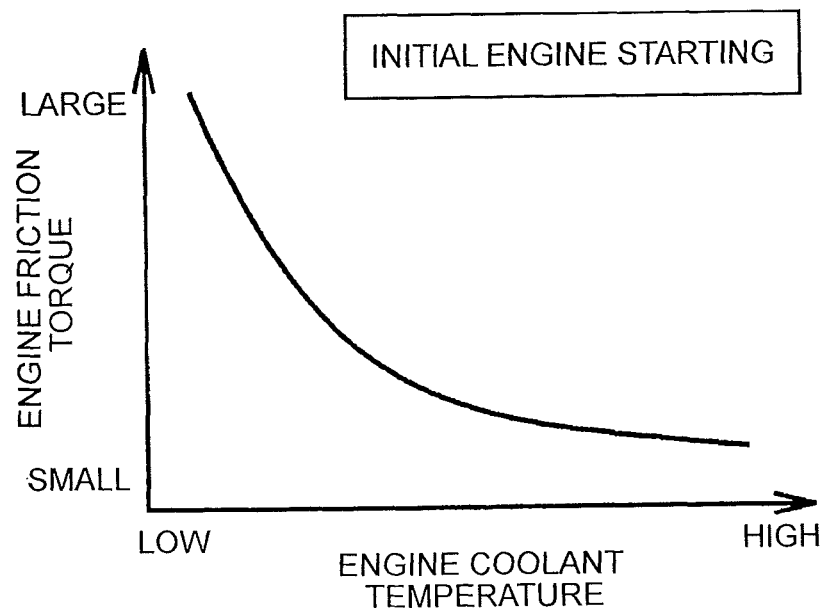
FIG. 6 is a graph that shows an example of an initial starting friction torque map for estimating the engine friction torque on the basis of a coolant temperature.
Figure 7:
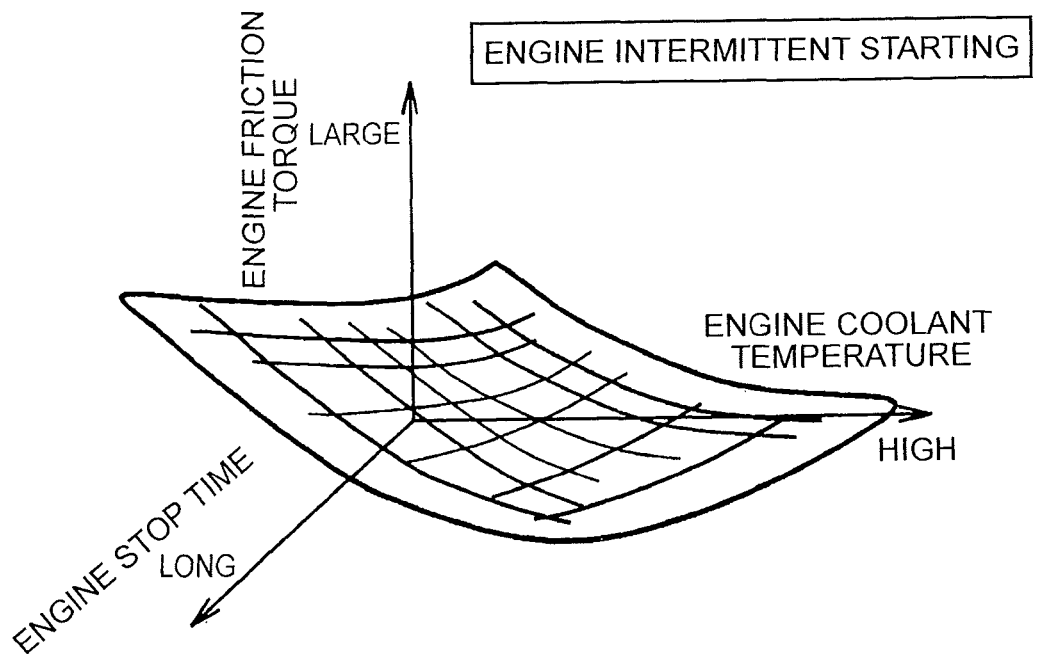
FIG. 7 is a graph that shows an example of an intermittent starting friction torque map for estimating the engine friction torque on the basis of a coolant temperature and an engine stop time.

It is presumable that the required starting torque Tsreq (engine friction torque) also varies on the basis of the traveling state, such as the coolant temperature THeng of the engine 14 at the time of engine starting, a starting history and an engine stop time at the time of intermittent starting. The starting history is, for example, whether it is initial engine starting after ignition is turned on or it is engine intermittent starting in which stop and operation of the engine 14 are switched by changing between EV traveling and EHV traveling. When it is determined that it is the initial engine starting, the traveling state incorporating unit 86, for example, calculates an estimated value of the engine friction torque on the basis of an actual coolant temperature THeng at the time of engine starting by consulting a predetermined correlation (initial starting friction torque map) in coordinates having the engine friction torque and the coolant temperature THeng as variables as shown in FIG. 6. In FIG. 6, as the coolant temperature THeng decreases, the engine friction torque is increased. When it is determined that it is the engine intermittent starting, the traveling state incorporating unit 86, for example, calculates an estimated value of the engine friction torque on the basis of an actual coolant temperature THeng at the time of engine intermittent starting and an actual engine stop time by consulting a predetermined correlation (intermittent starting friction torque map) in coordinates having the engine friction torque, the coolant temperature THeng and the engine stop time as variables as shown in FIG. 7. In FIG. 7, as the coolant temperature THeng decreases or as the engine stop time extends, the engine friction torque is increased. In FIG. 7, the correlation at the maximum value of the engine stop time between the engine friction torque and the coolant temperature THeng is equivalent to the initial starting friction torque map.

Figure 8:
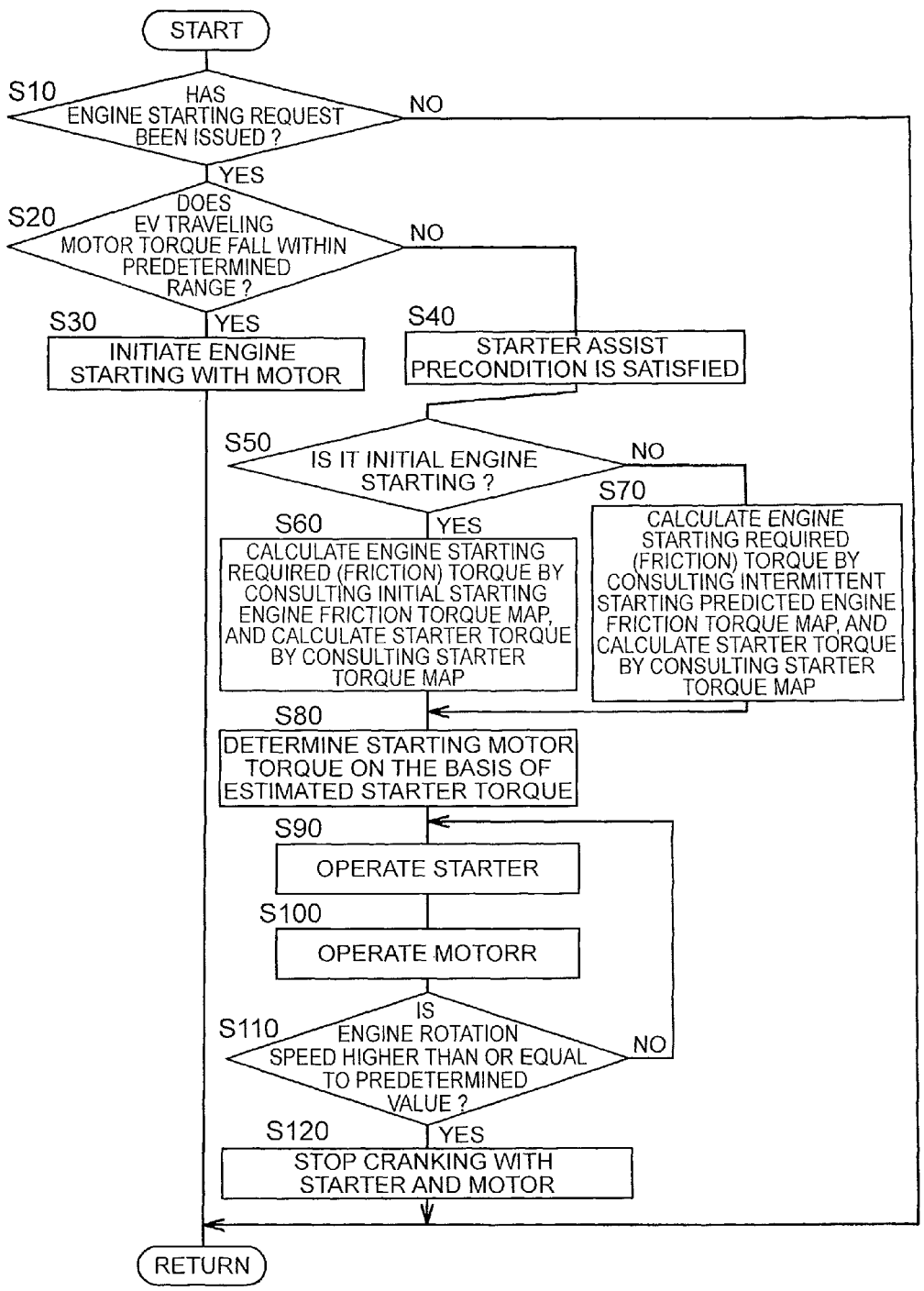
FIG. 8 is a flowchart that illustrates a relevant portion of control operations of the electronic control unit, that is, control operations for expanding the range of a required driving torque that can be provided by the electric motor.

FIG. 8 is a flowchart that illustrates a relevant portion of control operations of the electronic control unit 80, that is, control operations for expanding the range of the required driving torque Tdtgt in which the required driving torque Tdtgt can be provided by the electric motor MG, and is, for example, repeatedly executed at an extremely short cycle time of about several milliseconds to several tens of milliseconds.

In FIG. 8, initially, in step (hereinafter, step is omitted) S10 corresponding to the hybrid control unit 84, for example, it is determined whether an engine starting request has been issued. When negative determination is made in S10, the routine ends. When affirmative determination is made in S10, it is determined in S20 corresponding to the hybrid control unit 84 whether the EV traveling MG torque Tmev (required driving torque Tdtgt) falls within the EV traveling region, for example, during EV traveling. The EV traveling region is a region in which the required starting torque Tsreq is reserved in the maximum MG torque Tmmax, and the maximum MG torque Tmmax is varied with the main battery dischargeable power Woutm, so the EV traveling region is also varied with the main battery dischargeable power Woutm. During a stop of the vehicle, or the like, in preference to the above determination, it may be determined whether the required starting torque Tsreq falls within the maximum MG torque Tmmax. This determination is particularly useful when the required starting torque Tsreq becomes relatively large, for example, when the engine is cold. When affirmative determination is made in S20, in S30 corresponding to the hybrid control unit 84, for example, the engine 14 is started with the use of only the electric motor MG. On the other hand, when negative determination is made in S20, in S40 corresponding to the hybrid control unit 84, for example, it is determined that the precondition for starting the engine 14 with the use of both the electric motor MG and the starter 38 is satisfied. Subsequently, in S50 corresponding to the traveling state incorporating unit, for example, it is determined whether it is the initial engine starting. When affirmative determination is made in S50, S60 corresponding to the traveling state incorporating unit is executed; whereas, when negative determination is made, S70 corresponding to the traveling state incorporating unit is executed. In S60, for example, an estimated value of the engine friction torque (required starting torque Tsreq) is calculated on the basis of an actual coolant temperature THeng by consulting the initial starting friction torque map as shown in FIG. 6. For example, an estimated value of the maximum starter torque Tstmax is calculated on the basis of an actual auxiliary battery charged level SOCa and an actual auxiliary battery temperature THba by consulting the maximum starter torque map as shown in FIG. 5. In S70, for example, an estimated value of the engine friction torque (required starting torque Tsreq) is calculated on the basis of an actual coolant temperature THeng and an actual engine stop time by consulting the intermittent starting friction torque map as shown in FIG. 7. As in the case of S60, an estimated value of the maximum starter torque Tstmax is calculated. Subsequent to S60 or S70, in S80 corresponding to the hybrid control unit 84, for example, a starting MG torque Tmes (=Tsreq−Tstmax) is calculated on the basis of the estimated values of the required starting torque Tsreq and maximum starter torque Tstmax, calculated in S60 or S70. Subsequently, in S90 corresponding to the hybrid control unit 84, for example, the starter 38 is operated, and the engine 14 is rotationally driven at the maximum starter torque Tstmax. Subsequently, in S100 corresponding to the hybrid control unit 84, for example, after the crank angle Acr has exceeded a predetermined range of the crank angle Acr, the electric motor MG is operated in addition to the starter 38, and the engine 14 is rotationally driven at the starting MG torque Tmes. Subsequently, in S110 corresponding to the hybrid control unit 84, for example, it is determined whether the engine rotation speed Ne is higher than or equal to a predetermined value. When negative determination is made in S110, the process returns to S90; whereas, affirmative determination is made in S110, in S120 corresponding to the hybrid control unit 84, for example, rotational driving of the engine 14 with the use of the starter 38 and the electric motor MG is stopped.

As described above, according to the present embodiment, the engine 14 is started with the use of both the starter 38 and the electric motor MG, so, in comparison with the case where the engine 14 is started with the use of only the electric motor MG, the amount of electric power that is allowed to be used to output the EV traveling MG torque Tmev is increased within the main battery dischargeable power Woutm. Thus, it is possible to expand the EV traveling region in which the electric motor MG is used.

According to the present embodiment, when the sum of the required driving torque Tdtgt and the required starting torque Tsreq is smaller than or equal to the sum of the maximum MG torque Tmmax that is outputtable at the main battery dischargeable power Woutm and the maximum starter torque Tstmax that is outputtable at the electric power from the auxiliary battery 50, the engine 14 is started with the use of both the electric motor MG and the starter 38, so, in comparison with the case where the engine 14 is started with the use of only the electric motor MG, the amount of electric power that is allowed to be used to output the EV traveling MG torque Tmev is increased within the main battery dischargeable power Woutm. In addition, the starting performance of the engine 14 is appropriately ensured.

According to the present embodiment, the engine 14 is started with the use of both the electric motor MG and the starter 38 when the required starting torque Tsreq is smaller than or equal to the sum of the maximum MG torque Tmmax and the maximum starter torque Tstmax in the case where the required starting torque Tsreq is larger than the maximum MG torque Tmmax in preference to the case where the sum of the required driving torque Tdtgt and the required starting torque Tsreq is larger than the maximum MG torque Tmmax. Therefore, even when the required starting torque Tsreq is relatively large, it is possible to expand the engine startable region. That is, it is possible to increase the opportunity for starting the engine 14.

According to the present embodiment, at the time of starting the engine 14 with the use of the starter 38, the starter 38 outputs the maximum starter torque Tstmax that is outputtable at the electric power from the auxiliary battery 50. Therefore, the amount of electric power that is allowed to be used to output the EV traveling MG torque Tmev is increased within the main battery dischargeable power Woutm. Thus, it is possible to further expand the range of the required driving torque Tdtgt that can be provided by the electric motor MG. Thus, it is possible to further expand the EV traveling region in which the electric motor MG is used.

The embodiment of the invention is described in detail with reference to the drawings; however, the invention is also applicable to other embodiments.

For example, in the above-described embodiment (particularly, the flowchart shown in FIG. 8), when the engine 14 is started with the use of both the electric motor MG and the starter 38, the starter 38 is operated first and, after the crank angle Acr has exceeded the predetermined range of the crank angle Acr, the electric motor MG is operated in addition to the starter 38. However, the invention is not limited to this embodiment. For example, the starter 38 and the electric motor MG may be operated substantially at the same time or the electric motor MG may be operated first. Thus, in the flowchart shown in FIG. 8 in the above-described embodiment, the sequence, or the like, of execution of steps may be changed, for example, S90 and S100 may be executed at the same time or S90 may be executed subsequently to S100, as needed without serious inconvenience.

In the above-described embodiment, when the engine 14 is started with the use of both the electric motor MG and the starter 38, the starter 38 is caused to output the maximum starter torque Tstmax. However, the invention is not limited to this embodiment. For example, the starter 38 may be caused to output the amount of torque that is not enough to start the engine on the assumption that the electric motor MG is caused to output the MG torque Tm that is outputtable at the main battery remaining electric power. Alternatively, the required starting torque Tsreq may be distributed between the electric motor MG and the starter 38 at a predetermined ratio. In this way as well, the invention is applicable.

In the above-described embodiment, the vehicle 10 includes the auxiliary battery 50 and the main battery 54 as the electrical storage devices that supply electric power to the starter 38 and the electric motor MG. However, the invention is not limited to this embodiment. For example, the vehicle 10 may include only the main battery 54 as the electrical storage device. In such a case, for example, the voltage of the main battery 54 is stepped down to a predetermined voltage by a DC/DC converter, or the like, and is supplied as electric power corresponding to the electric power of the auxiliary battery 50. The electric power of the auxiliary battery 50 is a constant electric power that depends on the DC/DC converter, or the like, an electric power based on the main battery dischargeable power Woutm, or the like. In this way as well, the invention is applicable.

In the above-described embodiment, the vehicle 10 includes the starter 38, in addition to the electric motor MG, as the electric motor that outputs starting torque for starting the engine 14. However, the invention is not limited to this embodiment. For example, instead of the starter 38, the vehicle 10 may further include an electric motor that outputs starting torque and running torque as well as the electric motor MG In this way as well, the invention is applicable.

In the above-described embodiment, the engine 14 and the electric motor MG are indirectly coupled to each other via the separating clutch K0. However, the invention is not limited to this embodiment. For example, the vehicle 10 may not include the separating clutch K0, and the engine 14 and the electric motor MG may be directly coupled to each other. In this way as well, the invention is applicable.

In the above-described embodiment, the torque converter 16 is used as the fluid transmission device; instead, another fluid transmission device, such as a fluid coupling having no torque amplification function, may be used. The fluid transmission device does not always need to be provided.

In the above-described embodiment, the vehicle 10 includes the automatic transmission 18; however, the automatic transmission 18 does not always need to be provided.

The above-described embodiment is only illustrative, and the invention may be implemented in modes including various modifications and improvements on the basis of the knowledge of persons skilled in the art.

What is claimed is:

1. A control system for a vehicle, comprising:
an engine;
a first electric motor configured to output a starting torque for starting the engine;
a second electric motor configured to output a starting torque for starting the engine and a running torque;
an electrical storage device configured to supply electric power to the first electric motor and the second electric motor; and
a controller configured to start the engine with the use of both the first electric motor and the second electric motor at the time of starting the engine when the sum of a required driving torque that is required for the vehicle and a required starting torque that is required to start the engine is larger than a maximum output torque of the second electric motor, which is outputtable at the electric power from the electrical storage device.

2. The control system according to claim 1, wherein
the controller is configured to start the engine with the use of both the first electric motor and the second electric motor when the sum of the required driving torque and the required starting torque is smaller than or equal to the sum of a maximum output torque of the first electric motor, which is outputtable at the electric power from the electrical storage device, and the maximum output torque of the second electric motor, which is outputtable at the electric power from the electrical storage device.

3. The control system according to claim 1, wherein
the controller is configured to start the engine with the use of both the first electric motor and the second electric motor when the required starting torque is smaller than or equal to the sum of a maximum output torque of the first electric motor, which is outputtable at the electric power from the electrical storage device, and the maximum output torque of the second electric motor, which is outputtable at the electric power from the electrical storage device, in a case where the required starting torque is larger than the maximum output torque of the second electric motor, which is outputtable at the electric power from the electrical storage device, in preference to a case where the sum of the required driving torque and the required starting torque is larger than the maximum output torque of the second electric motor.

4. The control system according to claim 1, wherein
the first electric motor is configured to output the maximum output torque of the first electric motor, which is outputtable at the electric power from the electrical storage device, at the time of starting the engine with the use of the first electric motor.

5. The control system according to claim 1, wherein
the first electric motor is a starter, and
the electrical storage device includes a first electrical storage device configured to supply electric power to the first electric motor and a second electrical storage device configured to supply electric power to the second electric motor.

6. The control system according to claim 1, wherein
the second electric motor is provided in a power transmission path between the engine and a drive wheel, and the second electric motor is coupled to the engine via a clutch,
the controller is configured to be able to carry out motor running in which the running torque is transmitted to the drive wheel with the use of only the second electric motor in a state where the clutch is released, and
the controller is configured to transmit the starting torque from the second electric motor to the engine by setting the clutch in one of a slipped state and an engaged state at the time of starting the engine with the use of the second electric motor.

* * * * *